US005975702A

United States Patent [19]
Pugh, Jr. et al.

[11] Patent Number: 5,975,702
[45] Date of Patent: *Nov. 2, 1999

[54] METHOD OF USING POLARIZATION DIFFERENCING TO IMPROVE VISION

[75] Inventors: Edward N. Pugh, Jr., Philadelphia; Nader Engheta, Wayne, both of Pa.; Manoel P. Rowe, Bloomington, Ind.; J. Scott Tyo, Sandia Park, N.Mex.

[73] Assignee: The Trustees of the University of Pennsylvania, Philadelphia, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/617,539

[22] Filed: Mar. 15, 1996

[51] Int. Cl.$^6$ .................................. A61B 3/00; A61B 3/02
[52] U.S. Cl. ............................. 351/246; 351/232
[58] Field of Search ...................... 351/215, 205, 351/200, 246, 245, 232, 222; 348/29

[56] References Cited

U.S. PATENT DOCUMENTS 3,992,571  11/1976  Garlick et al. .

FOREIGN PATENT DOCUMENTS 1363404  1/1973  United Kingdom .

OTHER PUBLICATIONS

Gilbert, et al., "Underwater Experiments on the Polarization, Coherence, and Scattering Properties of a Pulsed Blue–Green Laser," U.S. Naval Ordinance Test Station, pp. A–II–1–A–II–7.

Gilbert, et al., "Improvement of Underwater Visibility by Reduction of Backscatter with a Circular Polarization Technique," U.s. Naval Ordinance Test Station, pp. A–III–1–A–III–11.

Halajian, et al., "Principles and Techniques of Polarimetric Mapping," In *Proceedings of the Eighth International Symposium on Remote Sensing of Environment*, vol. 1, Oct. 1972, pp. 523–540.

Seibert Q. Duntley, "Underwater Visibility and Photography," Chapter 7 from book entitled *Optical Aspects of Oceanography*, Academic Press, New York, 1974, pp. 135–149.

Robert Walraven, "Polarization Imagery," *Optical Polarimetry*, SPIE vol. 112, 1977, pp. 164–167.

Solomon, "Polarization imaging," *Applied Optics*, vol. 20, No. 9, May 1, 1981, pp. 1537–1544.

Hallock, et al., "Polarization imaging and mapping," *Applied Optics*, vol. 22, No. 7, Apr. 1, 1983, pp. 964–966.

Mickols, et al., "Imaging differential polarization microscope with electronic readout," *Rev. Sci. Instrum.*, vol. 56, No. 12, Dec. 1985, pp. 2228–2236.

Kim et al., "Differential Polarization Imaging," *Biophys. J.*, vol. 52, Dec. 1987, pp. 911–927, 929–946.

Lawrence B. Wolff, "Polarization–Based Material Classification from Specular Reflection," *IEEE Transactions on Pattern Analysis and Machine Intelligence*, vol. 12, No. 11, Nov. 1990, pp. 1059–1071.

(List continued on next page.)

*Primary Examiner*—Hung Xuan Dang
*Attorney, Agent, or Firm*—Woodcock Washburn Kurtz Mackiewicz & Norris LLP

[57] ABSTRACT

The present invention is directed to a system, which uses polarized light difference to improve vision. The system obtains an image at a first polarization direction. The system then obtains an image at a second orthogonal polarization direction. The second orthogonal polarization value is subtracted from the first value. The difference value is then amplified in order to provide an enhanced image.

8 Claims, 9 Drawing Sheets

OTHER PUBLICATIONS

Barry A. Swartz, "Laser range–gated underwater imaging including polarization discrimination," *Underwater Imaging, Photography and Visibility,* SPIE vol. 1537, 1991, pp. 42–56.

Egan, et al., "Terrestrial polarization imagery obtained from the Space Shuttle: characterization and interpretation," *Applied Optics,* vol. 30, No. 4, Feb. 1, 1991, pp. 435–442.

Cameron, et al., "Double cones as a basis for a new type of polarization vision in vertebrates," *Nature—International Weekly Journal of Science,* vol. 353, No. 6340, Sep. 12, 1991, pp. 161–164.

Choudhury, et al., "Atmospheric effects on SMMR and SSM/I 37 Ghz polarization difference over the Sahel," *Int. J. Remote Sensing,* vol. 13, No. 18, 1992, pp. 3443–3463.

Wolff, et al., "Liquid Crystal Polarization Camera," *IEEE Workshop of Applications of Computer Vision,* Nov. 20, 1992, pp. 120–127.

Kerr, et al., "On the use of passive microwaves at 37 GHz in remote sensing of vegetation," *Int. J. Remote Sensing,* vol. 14, No. 10, 1993, pp. 1931–1943.

Smith et al., "The Relationship Between Anomalies of Interannual Net Radiation and 37 Ghz Polarization Difference over North–Africa," *Climatic Change,* Feb. 1993, pp. 141–154.

Rowe, et al., "Polarization–Difference Vision: Potential Engineering Applications," *Eleventh Annual Benjamin Franklin Symposium, Philadelphia, Pennsylvania,* May 1993, Abstract.

Cheng, et al., "Multispectral Imaging Systems Using Acousto–Optic Tunable Filter," *Infrared and Millimeter–Wave Engineering,* SPIE vol. 1874, 1993, pp. 224–231.

Cheng, et al., "Target Detection Using An AOTF Hyperspectral Imager," *Optical Pattern Recognition V,* SPIE vol. 2237, 1994, pp. 251–259.

J. Scott Tyo, "Automatic Rotational Polarizer (ARP) for the Polarization–Differencing Camera," *University of Pennsylvania EE442 Senior Design Project Final Report,* Spring 1994, 38 pages.

Rowe, et al., "Polarization–Difference Imaging (PDI): A Biologically Inspired Technique for Observation Through Scattering Media," *Optics Letters,* Jun. 1994, pp. 1–7.

Tyo, et al., "Polarization–Difference Vision and Imaging: from Double Cone Photoreceptors to Underwater Observation," *World Congress on Neural Network, San Diego, California,* Jun. 6–10, 1994, Abstract.

Tyo, et al., "Contrast Enhancement for Underwater Imaging Using a Polarization Differencing Technique Based on Biological Visual Systems," *IEEE A–P–S International Symposium, Seattle, WA,* Jun. 19–24, 1994, p. 480.

Egan, et al., "Polarimetric Detection of Land Sediment Runoff into the Ocean Using Space Shuttle Imagery," *Engineering Laboratory Notes,* vol. 17, No. 3, Aug. 1994, pp. S–17 to S–24.

Cheng, et al., "Analysis of AOTF hyperspectral imagery," *SPIE,* vol. 2231, Sep. 1994, pp. 158–166.

Tyo, et al., "Biologically inspired polarization–difference imaging for seeing through scattering media," *OSA Annual Meeting/ILS–X Program,* Oct. 3, 1994, Abstract.

Rowe, et al., "Polarization–difference imaging: a biologically inspired technique for observation through scattering media," *Optics Letters,* vol. 20, No. 6, Mar. 15, 1995, pp. 608–610.

Tyo, et al., "Biologically Inspired Polarization–Difference Imaging: from Double Cone Photoreceptors to Imaging in Scattering Media," *13$^{th}$ Annual Benjamin Franklin Symposium, Philadelphia, PA,* May 5, 1995, Abstract.

METHOD OF USING POLARIZATION DIFFERENCING TO IMPROVE VISION

GOVERNMENT SUPPORT

This invention was supported in part by funds from the U.S. Government (Grant No. NIH 5-R01-E4-02660) and the U.S. Government may therefore have certain rights to this invention.

FIELD OF THE INVENTION

The present invention is directed to systems for increasing depth of visibility and visual resolution using polarized light differences. In particular, the present invention is directed to a system for increasing visual range and vision using polarization differentials.

BACKGROUND OF THE INVENTION

The present invention is directed to improved optical imaging systems using polarized light. Many animals, such as fish, have visual systems that may exploit optical polarization. Some biological systems are believed to compute difference signals using parallel arrays of photoreceptors which are optimally tuned to orthogonal polarizations. It is believed that polarization-differencing systems can improve the visibility of objects in scattering media by serving as a common mode rejector and differential amplifier which reduces the effect of background scattering and which amplifies the signal from a target whose polarization-difference magnitude is distinct from the background.

Optical scattering caused by suspended particals (e.g. fog, rain, plankton) has been shown to diminish the visual contrast of objects. Although polarization sensitive vision is well documented in aiding navigation, some types of polarization-sensitive vision also may serve to enhance the visibility of targets in scattering media.

The human eye is a highly evolved efficient visual mechanism for everyday viewing conditions. Typical viewing conditions are those which exist in relatively clear air with sufficient light intensity. However, there are many times when viewing conditions are not optimal for human vision, such as in foggy, cloudy, and underwater environments where particulates are present. Human beings cannot efficiently detect polarization and polarization differentials.

As noted above, there are species of animals which have demonstrated polarization sensitivity. These species include bees, some salamanders and certain types of fish. It is believed that bees use polarization as a navigational aid. It is not known how species of fish, like the *Lepomis cyanellus* (green sunfish) may utilize such polarization information. But, it has been hypothesized that these fish might actually subtract polarization intensities at two orthogonal polarizations.

The human visual system computes the intensity of visible light at discrete points on the retina without utilizing polarization information. An analogous image is created in the lab by taking a "summed" or non-polarized (NP) image. To produce this image, the camera operator measures a frame through a linear polarizer aligned along a unit vector e1, then adds to it another frame taken through the same linear polarizer aligned along e2, a unit vector perpendicular to e1.

After the two frames are taken and added, the result is the final non-polarized image. A PD image can also be created using a camera and a linear polarizer. By taking frames at two orthogonal polarizations oriented in the same way as in the NP image, then subtracting the images instead of adding, a PD image can be formed. At each point, the intensity can be represented as:

$$_{pd}I(x,y)=I\|(x,y)-I\bot(x,y)$$

$$_{np}I(x,y)=I\|(x,y)+I\bot(x,y)$$

A number of prior art systems have been disclosed in the literature which either discuss or disclose optical polarization systems and theory. In the Sep. 12, 1991 Edition of "Nature", Cameron and Pugh discussed the existence of double cones as a basis for a new type of polarization vision in vertebrates in which it was postulated that certain invertebrates and vertebrates are sensitive to light polarization.

In "Polarization Imagery", 112 Optical Polar Imagery (1977), Walraven discussed the polarization of reflected radiation providing useful information that can be used in remote sensing applications to help distinguish different natural surfaces with similar structural signatures. Dr. Gary D. Gilbert and J. C. Pernicka of the Systems Development Department of the U.S. Naval Ordinance Test Station has disclosed a system in which underwater targets were illuminated, photographed and photometered both with and without the use of a circular polarization technique.

Wolff, Mancini, et al. developed a liquid crystal polarization camera which combined CCD camera technology with liquid crystal technology to create a polarization camera capable of sensing the polarization of reflected light from objects at pixel resolution.

In "Differential Polarization Imaging", December, 1987 Journal of the Biophysical Society, Kim, Keller and Bustamante discussed a theory of differential polarization imaging. It was shown that for any arbitrary object, images can be obtained by combining different incident polarizations of light measuring the specific polarization components transmitted or scattered by the object.

Cheng, Chao, et al. in Multi-Spectral Imaging Systems using Acousto-Optic Tunable Filter, (1993) discuss activities in the development of a new type of remote sensing multi-spectral imaging instrument using acousto-optic tunable filter as a programmable band pass filter. The remote sensor filter provides real time operation and observational flexibility in the measurement of spectral, spacial and polarization information using a single instrument.

Finally, U.S. Pat. No. 3,992,571 to Garlick et al. discloses a detector for measuring differential optical polarization effects which comprises a television camera incorporating a polarization analyzing system. The camera generates two similar video signals representing two views of the same scene which are derived by means of like components-differing only in respect of their polarization characteristics. The two video signals are compared over the whole scene on a point-by-point basis.

None of the prior art systems disclose a system for enhancing vision using polarization differences and removing common modes. It is believed that a man-made polarization difference imaging (PDI) system, similar to that believed to be found in some types of polarization-sensitive animals, could enhance the visibility of target features in scattering media. It would be desirable to have an optical enhancement system which would provide enhanced vision using polarized light differentials. Such a system could be used to enhance vision underwater, in fog and through clouds. It would be particularly desirable to provide a system including a mechanism for automatically rotating the polarizer to optimize the polarization differentials. These and other objects of the present invention will become apparent from the following summary and detailed description.

SUMMARY OF THE INVENTION

In accordance with the present invention, a method for utilizing polarization differencing for providing enhanced visual perception is disclosed. In a first embodiment, the present invention comprises the following steps: capturing a first signal having a first polarization value; capturing a second optical signal at a second polarization value; subtracting said second from said first signals, and amplifying the signals such that the difference value uses the full dynamic range of the screen.

In a further embodiment, the present invention discloses an apparatus for increasing the distance at which an object can be viewed using polarization differences comprising: means for obtaining a polarization intensity at a first linear polarization direction and for obtaining a polarization intensity at a second orthogonal polarization; means for subtracting said polarization intensities on a pixel by pixel basis between said first and second orthogonal signals; means for amplifying said difference values such that it uses the full dynamic range of the screen; and means for displaying said image.

In yet a further embodiment, the present invention is directed to an apparatus for increasing the distance at which an object can be viewed using polarization differences comprising: means for obtaining a polarization intensity at a first linear polarization direction; means for taking a polarization intensity at a second orthogonal polarization; means for rotating said first and second means such that the polarization and difference of non-target background is minimized; means for amplifying the difference signal; and means for generating an image based upon said difference value.

In summation, the apparatus and method of the present invention provides a system and method which captures images at two orthogonal linear polarizations. The present invention computes the difference of the images pixel-by-pixel, and re-scales the resultant difference image for optimum use of the monochrome display range. Symbolizing the two image intensity distribution as $I\|(x,y)$ and $I\bot(x,y)$, where (x,y) identifies the pixel position in the image and $\|$ and $\bot$ indicate two orthogonal linear polarizations defined below, the system generates the polarization-difference (PD) image $$_{pd}I(x,y)=I\|(x,y)-I\bot(x,y). \quad (1a)$$

The system also computes the polarization-sum (PS) image $$_{ps}I(x,y)=I\|(x,y)+I\bot(x,y). \quad (1b)$$

For an ideal linear polarizer, the PS image is equivalent to a polarization-blind image obtained by a conventional imaging system. In general, $I_{pd}(x,y)$ depends upon the choice of polarization axes whereas $I_{ps}(x,y)$ does not. A fuller understanding of the present invention and its features can be gleaned from the following detailed description and claims.

BRIEF DESCRIPTION OF THE FIGURES

FIG. 3A–3F' are the results of an experimental system in accordance with the present invention.

DETAILED DESCRIPTION OF THE PRESENT INVENTION

Figure 1:
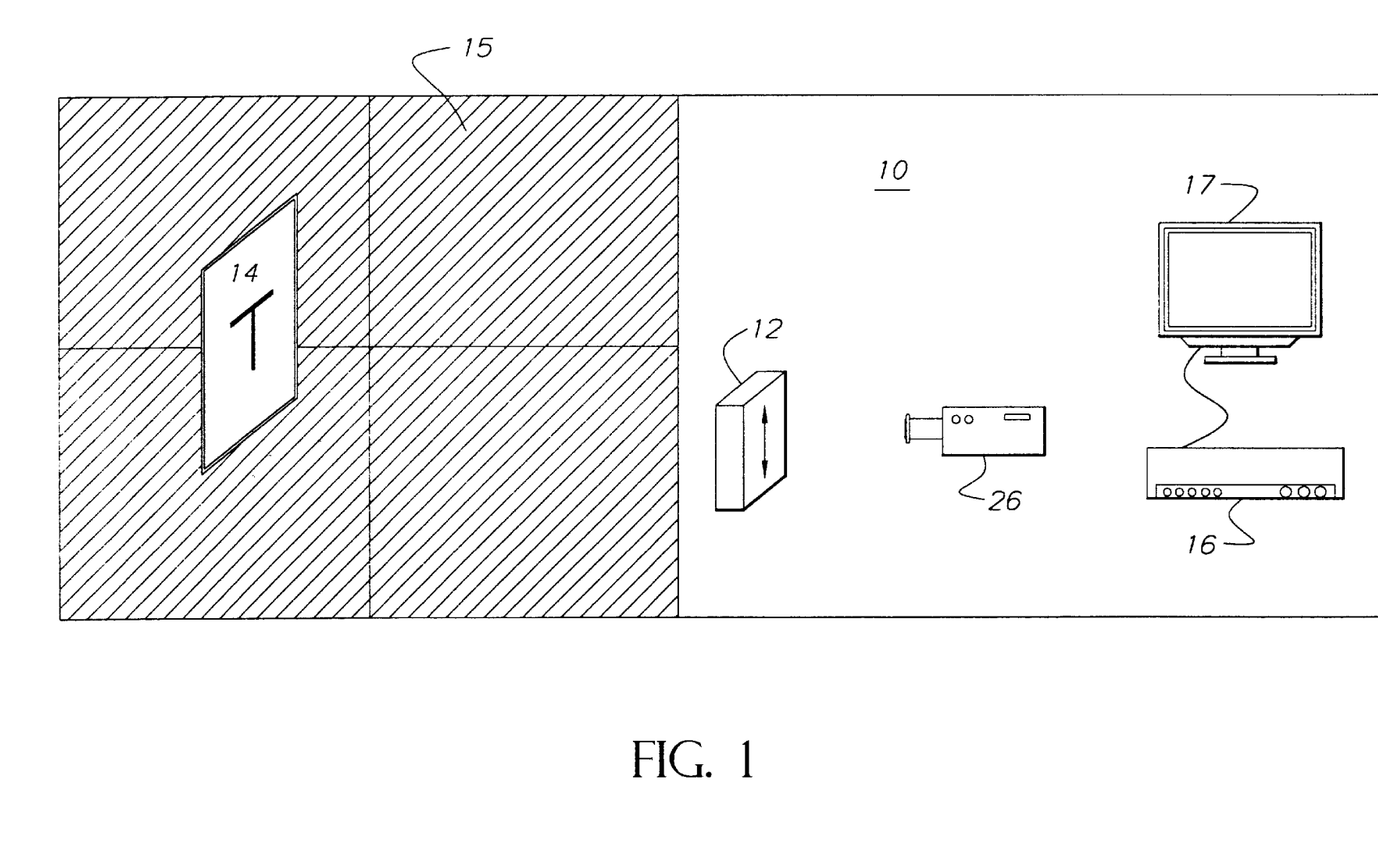
FIG. 1 is a block diagram of a polarization differential system in accordance with the present invention.

The present invention is described with reference to the enclosed Figures wherein the same numbers are used where applicable. FIG. 1 is a perspective view of a system 10 in accordance with the present invention. In a most preferred embodiment, the present invention comprises a method and apparatus for determining linear polarization differences. The present invention includes a linear polarizer 12 which is utilized to measure two orthogonal linear polarization intensifies emanating from an object or target 14 to be viewed in a scattering medium. The polarizer 12 operates in two positions and during operation, two orthogonal polarization readings are taken from the target or object 14 being observed within scattering medium 15. The images are captured by a CCD camera 26. The polarization readings are first summed and then subtracted by an image processor 16. Sum and difference images are then amplified and shown on a monitor 17. It is to be noted that the subtraction of polarized images can occur on a pixel by pixel basis.

In a more preferred embodiment, the polarizer 12 comprises a twisted nematic liquid crystal and a linear polarizer to be described more fully below. When the crystal is activated, the crystal and the polarizer facilitate the entry of polarized light having a first polarization value. Manual manipulation of the system causes the orientation of the various optical components to change slightly, thus causing successive images to be translated by a small amount on the camera head. These small translations show up as motion artifacts in the final PD image. The said artifacts can be eliminated using the twisted nematic liquid crystals and the polarizer. When the crystal is not activated, the crystal and the polarizer permit the entry of light having a second polarization value. A difference value is then created by subtracting the second signal from the first signal. These difference signals are then amplified. CCD Camera 26 records the images, with the resulting subtraction comprising a difference image.

Figure 2:
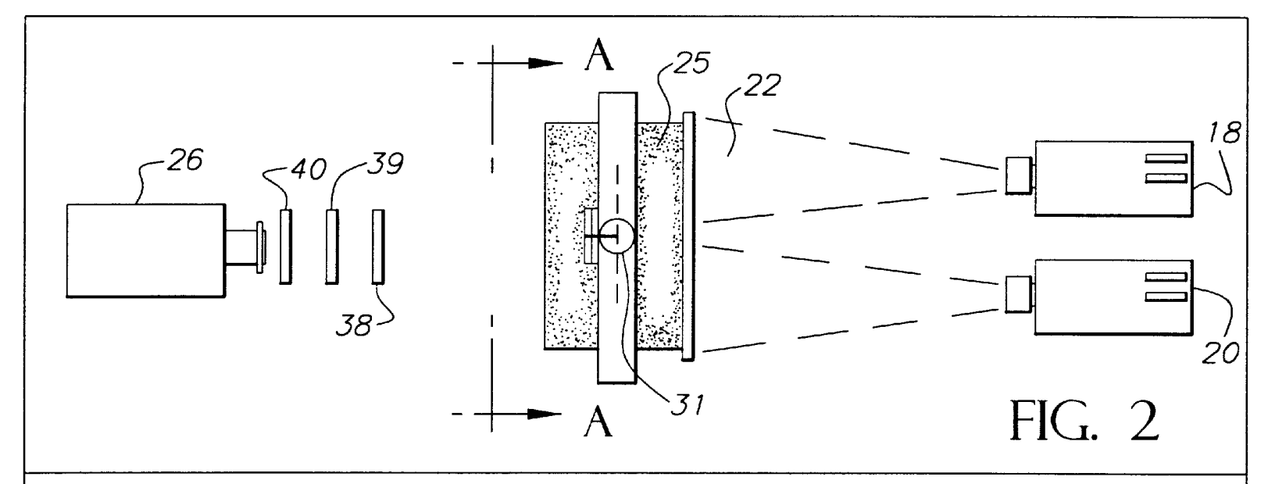
FIGS. 2 and 2A are enhanced block diagrams of an experimental polarization differencing system in accordance with the present invention.
Figure 2A:
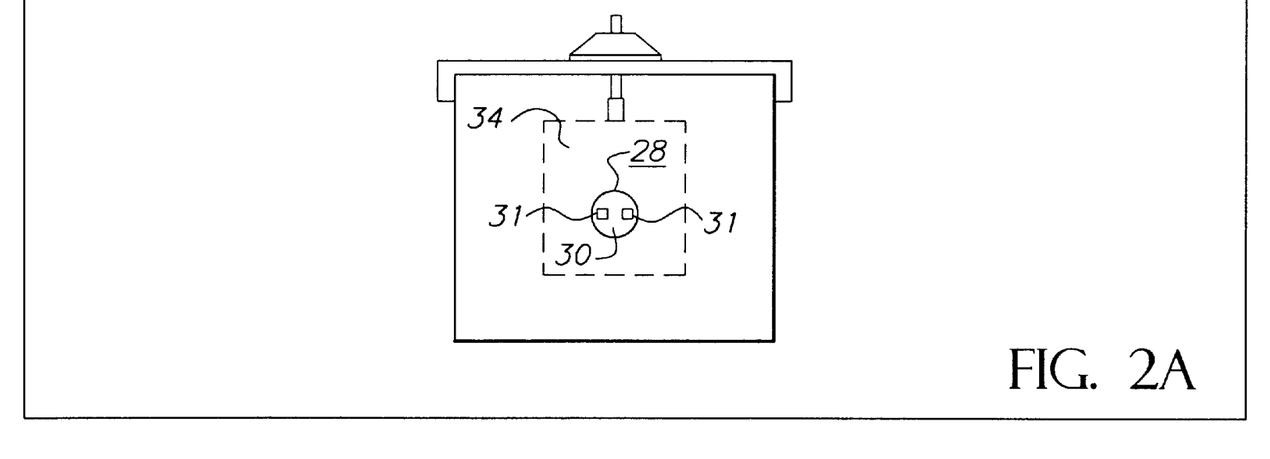

The theoretical basis underpinning the present invention is more fully discussed with reference to the apparatus of an experimental layout shown out in FIGS. 2 and 2A. As shown, two incandescent tungsten filament slide projectors 18, 20 back-illuminate a sheet of 0.25' thick white plexiglass 22 attached to one face of a glass tank 24. Experimentally, the tank 24 is filled with water to which milk 25 is added. The plexiglass 22 functions as an initial diffuser and the milk as a strong scattering agent. The tank 24 is viewed with a CCD camera 26 such as the Hamamatsu Model XC-77.

In the absence of a target, the region viewed by the CCD camera 26 has an average radiance (~7.2 W/(m²)) uniform to within 15% and is unpolarized. A target 28 comprising an aluminum disk 30 is suspended in the middle of the tank by means of a rod 32 attached to the disk face 30 occluded from the camera 26. The rod 32 is attached to a clear plexiglass mount 34 suspended from above. The surface of this mount 34 is perpendicular to the incident light, and both mount 34 and the rod 32 attached to the disk 30 are undetectable to both PDI and conventional imaging. The disk 30 surface facing the CCD camera 26 is sandblasted, rendering it nearly Lambertian except for two 1-cm² patches 31. These patches 31 are raised a few thousandths of an inch and have been abraded with emory paper lightly in orthogonal directions— on one patch roughly radially, and on the other roughly tangentially.

CCD camera 26 is preferably equipped with a macro lens (Vivitar Y/C 55 mm 2.8) and forms an image of the target plane, which is digitized and processed with an image analysis system having a 16-bit accumulator, such as the Series 151, by Imaging Technology, Inc. Before reaching the CCD camera 26, the light from the tank 24 passes through twisted nematic liquid crystal (TNLC) 38. In its off state the TNLC 38 rotates the plane of polarization of incident light by 90°; when driven, the TNLC 38 passes the incident light with no rotation. From the TNLC, the light then passes through a linear analyzer 39.

A narrow-band filter 40, with a half maximum band-width of 10 nm and centered at 610 nm, eliminates light out of the operating waveband of the TNLC 38. The TNLC/Analyzer 38, 39 combination selects the orthogonal axes of the polarization-difference image as follows: when the TNLC is driven, the TNLC/Analyzer 38, 39 passes only light polarized parallel to the analyzer axis, yielding the image $I\|(x,y)$; when the TNLC is off, the TNLC/analyzer combination passes light polarized perpendicular to the analyzer axis, yielding $I\perp(x,y)$.

Figure 3:
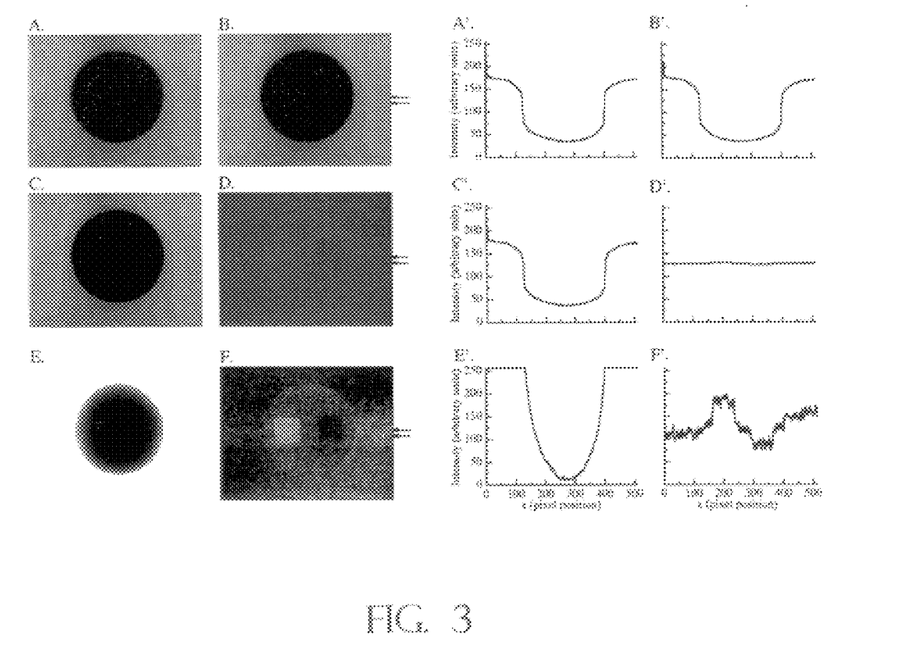

Referring to FIG. 3, the results of the experimental PDI system to the aluminum target 30 suspended in diluted milk is shown. Panels A and B present the images, $I\|(x,y)$ and $I\perp(x,y)$, convolved with a two dimensional (low-pass) filter. For each of these Panels, 128 consecutive frames were summed and then divided by 8. Panels C and D present the sum and difference images. Panels E and F represent the data in images in C and D, but now scaled to utilize the full 8-bit intensity range of the display.

The abraded patches 31, which are not visible in Panels A, B and C are clearly visible in the scaled PD image (Panel F), but barely visible in the scaled PS image (Panel E). Panels A'–F' present numerical plots of average pixel intensities in the vertical bands between the arrows shown in A–F. The associated plots provide quantitative evidence supporting the qualitative conclusion drawn from inspection of the images, i.e., that the abraded patch regions 31 are most distinct from the disk background in the scaled difference image (F, F'), The principal factor underlying the enhanced visibility of the two patches 31 in Panel F is the common-mode rejection feature intrinsic to PDI. Given that a target or target feature produces a non-zero value of $_{pd}I(x,y)$ in some region, the system enables extraction of this feature by "rejecting" the intensity "common" to both polarization axes. This common-mode rejection feature of the PDI system is exhibited in two ways in the images of FIG. 3A–3F. The relatively intense halo of unpolarized light surrounding the disk is eliminated (C' and D'), and secondly, the relatively modest (20%) intensity variation across the disk surface is also minimized, allowing higher gain to be applied to the final displayed PD image (E' and F').

The results shown in FIG. 3 illustrate the general applicability of PDI. For a particular region of the image, the "observed degree of linear polarization", defined as $<ODLP>_{region}=<_{pd}I(x,y)>_{region}/<_{ps}I(x,y)>_{region}$, serves as a dimensionless measure of the PD signal magnitude. For the left patch, $<ODLP>=+0.0164$; for the right patch, $<ODLP>=-$ 0.0138. Moreover, in experiments in which the milk concentration is revised to degrade the images until the target patches are undetectable, target patches having $<ODLP><0.01$ could still be readily seen in inspection of the PD image. The images of many object surfaces in natural environments predictably will have ODLPs of considerably higher magnitude. [13]

Secondly, PDI easily generalizes to scattering environments in which the "background" itself has non-zero $_{pd}I(x,y)$ for a given set of orthogonal polarization axes. The present invention suggest that judicious selection of the axes of the PDI system can enhance the $_{pd}I(x,y)$ of target regions relative to that of the background in the image plane. Finally, PDI also possesses the generally useful qualities of being passive, simple and potentially very fast. PDI can operate passively in any region of the electromagnetic spectrum in which natural radiation exists. PDI does not require the use of sophisticated image processing techniques. PDI is also potentially very fast, inasmuch as it can be implemented in a massively parallel system, as nature appears to have done in the retinas of many animals. The present invention thus provides a method to display $_{pd}I(x,y)$ allowing us to maximize the use of the dynamic range of display by information that survives the common mode rejection.

An optional feature of the present invention is the provision of mechanism for automatically rotating the polarizer 39 in order to achieve the optimal position of the polarizer in order to minimize the effect that partially polarized light has on the image. It is necessary to select the two orthogonal directions e1 and e2 such average background linear polarization p bisects the right angle between the basis vectors. This selection guarantees that the projection of p onto e1 is equal to the projection of p onto e2, giving rise to the common mode rejection of the PDIS.

The incorporation of an automatic rotational polarizer in the present invention enables the system to select the best set of orthogonal basis vectors for the PD camera through rotation so that p bisects e1 and e2. As noted above fixed, twisted nematic liquid crystal (TNLC) 38 such as manufactured by the Liquid Crystal Institute at Kent State University is used in conjunction with a linear polarization analyzer 39. TNLC 38 has two states: a relaxed state and an excited state. The TNLC is very similar in concept to the liquid crystal used in a common digital LCD wristwatch. In its relaxed (off) state, the crystal rotates the polarization state by ninety degrees. In its excited (on) state, the light is allowed to pass without its polarization being changed.

Nematic liquid crystals comprise long rod-like molecules that tend to line up in a coplanar manner. These liquid crystal molecules can also be polarized as electric dipoles. When the molecules are lined up in planes perpendicular to the direction of light propagation, they are birefringent. This means that the index of refraction is polarization dependent. In essence, each plane of liquid crystal molecules has a "fast" axis and a "slow" axis. Light polarized parallel to the fast axis propagates at a higher speed than the light polarized parallel to the slow axis.

Figure 4:
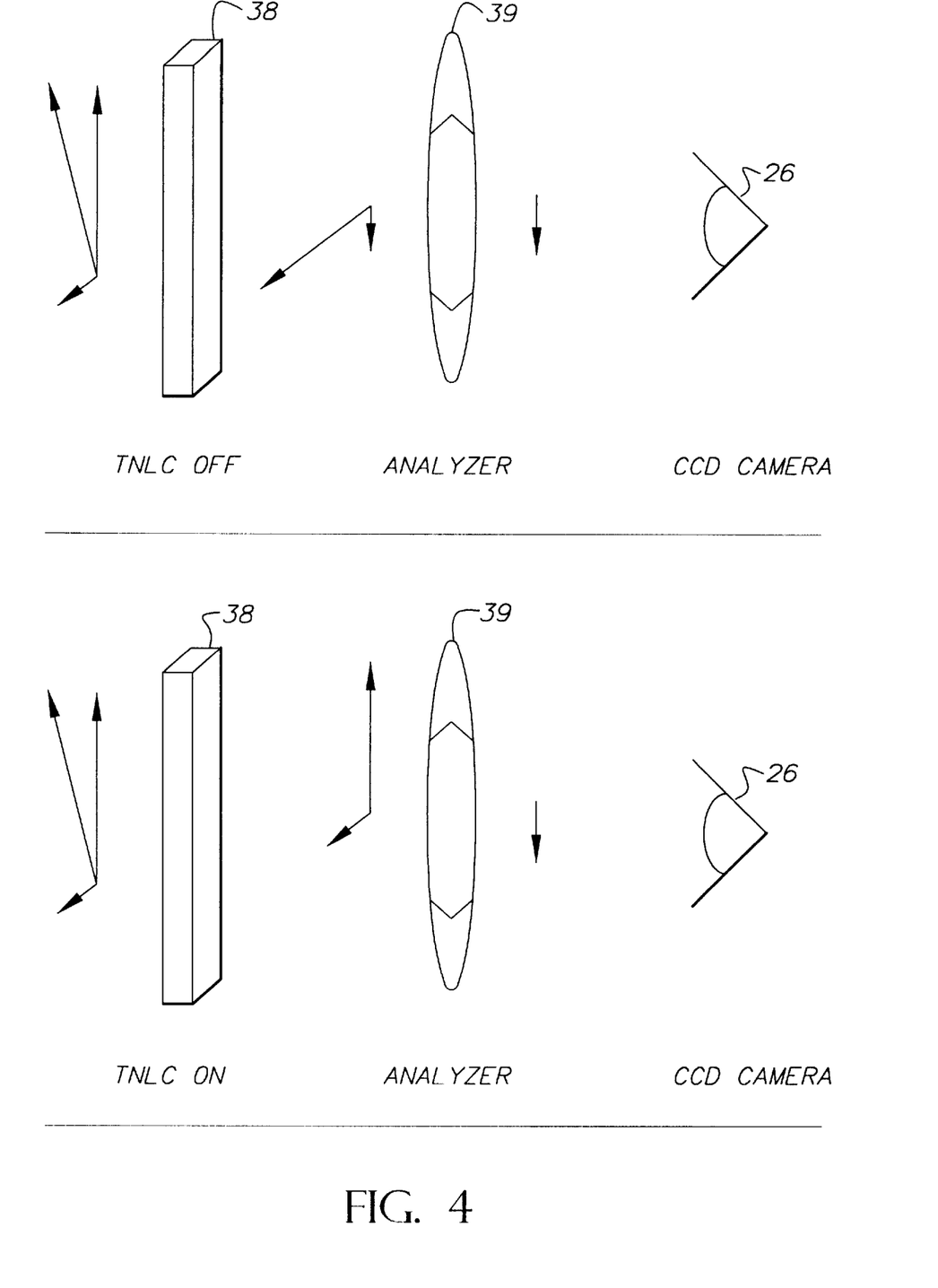
FIG. 4 is a representation of the use of the twisted nematic liquid crystal and the polarizer in accordance with the present invention.

Referring now to FIG. 4, in the relaxed twisted nematic configuration, each successive plane of nematic liquid crystal is made to be slightly rotated about the direction of propagation from the previous plane. This continues plane by plane until the last plane of molecules is orthogonal to the first plane of molecules. This gradual change of orientation causes the light polarized along the fast axis (or slow axis) to rotate as it passes through the liquid crystal. The final result is that the polarization state of the output light is rotated by ninety degrees with respect to the polarization of the incoming light. For example, if the incident light is elliptically polarized and its major axis makes a thirty degree angle with the horizontal axis, the output light will also be elliptically polarized and its major axis will make a 120 degree angle with respect to the horizontal axis. It is important to note that because the TNLC 38 is highly dispersive, this operation can only be performed at a specific wavelength (different for each TNLC). The TNLC is designed to operate at a center wavelength of 610 nm, so we place a narrow band filter in the optical path to remove all other wavelengths.

When a voltage is applied across the TNLC 38, all of the liquid crystal molecules align themselves parallel to the electric field. Since the direction of alignment is parallel to the direction of propagation, there is essentially no fast or slow axis, and therefore, there is no birefringence. This enables the light to pass through the crystal without having its polarization affected. Care must be taken in applying the exciting voltage so as not to damage the TNLC. If a DC voltage is applied, the leakage current through the TNLC will cause the destruction of the crystal. For this reason, a 5 $V_{rms}$, 0VDC waveform must be applied. The period of this waveform should be much shorter than the mechanical response time of the TNLC. A frequency of 100 Hz or greater may be used.

This liquid crystal 38 is coupled with polarization analyzer 39 to create images captured at orthogonal polarizations. These images can now be obtained without any mechanical manipulation. First, a polarization direction (e1) is selected on the analyzer. Next, the crystal 38 is allowed to relax. After relaxation, the polarization state of the light incident upon the TNLC 38 is rotated ninety degrees before excitation. Because of this rotation, the component of the light that was parallel to e1 originally is now parallel to e2. Since e2 is perpendicular to e1, this component is not allowed to pass through the analyzer to the camera head. In the same manner, the component of the light that was originally polarized parallel to e2 is allowed to pass the analyzer. Once an image is taken at this polarization, the TNLC 38 is electrically excited. In this state, the light exiting the TNLC 38 (entering the polarizer) is unaffected, except for a small amount of attenuation. After passing through the polarizer, the light coming through the TNLC which is incident upon the camera head is polarized along e1. The component which was polarized along e2 and allowed to pass in the relaxed state is now blocked out.

Once the two images are taken at orthogonal polarizations, the PD image can be created by subtracting the intensity values in the two original frames pixel by pixel. The average intensity over the entire PD frame should be as close to zero as possible. This condition is met when the background light is unpolarized, circularly polarized, or if p bisects e1 and e2. If the average over the frame is not within specifications a stepping motor will rotate the linear polarizer so that a new vector e1 is chosen. The process outlined above is then performed again, and a new PD image is created. Once again, the average is taken and the entire scheme is repeated until the average over the entire PD image meets specifications.

Figure 5:
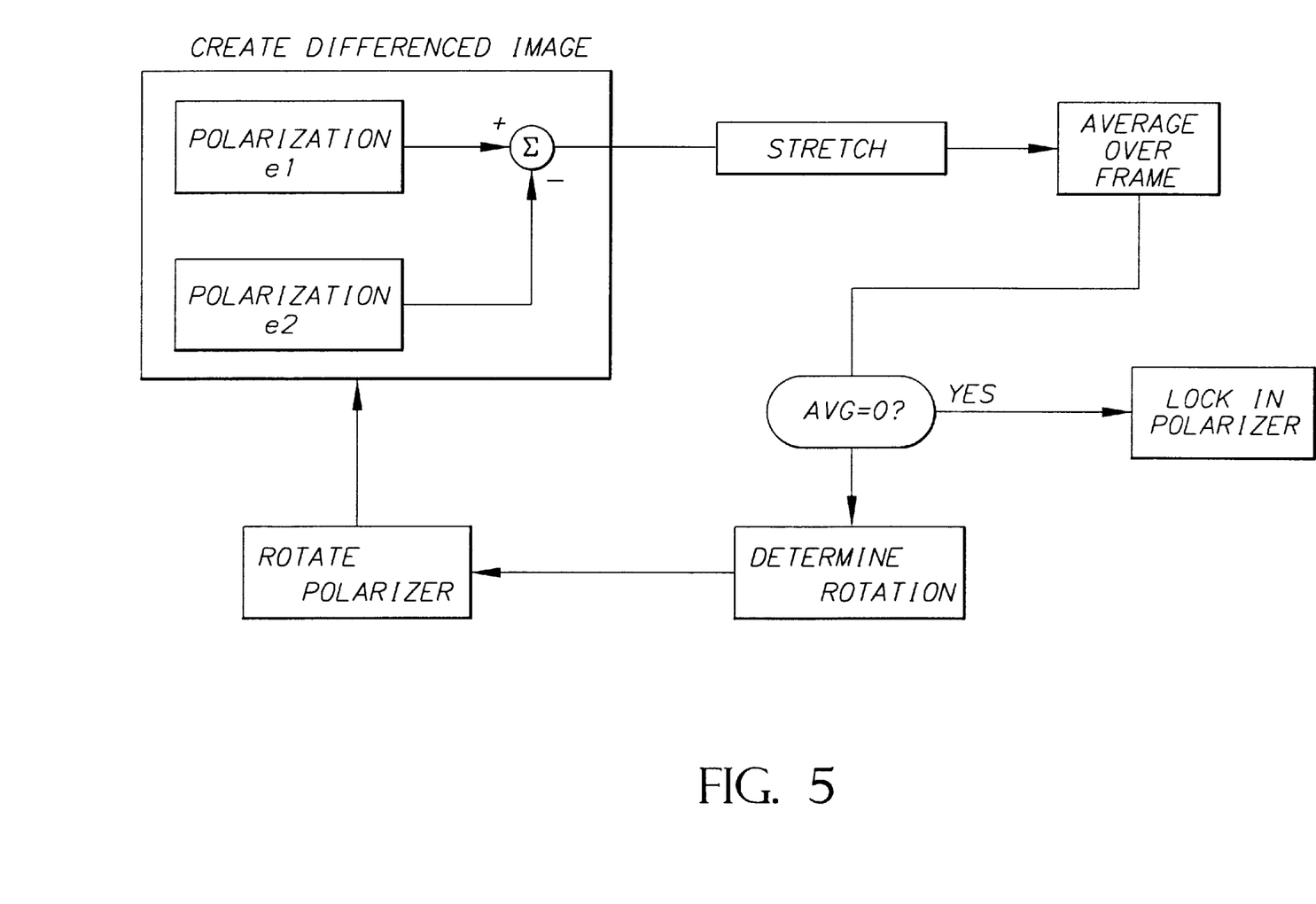
FIG. 5 is a flow chart diagram illustrating the operation of the automatic rotational polarizer.

Referring now to the flow chart of FIG. 5, stepper motor 46 finds an appropriate set of basis vectors in order to eliminate the common mode. As shown in FIG. 5, a computer controlled feedback system is used to control the stepper motor 46 that rotates the analyzer 39 to select a proper set of basis vectors.

Figure 6:
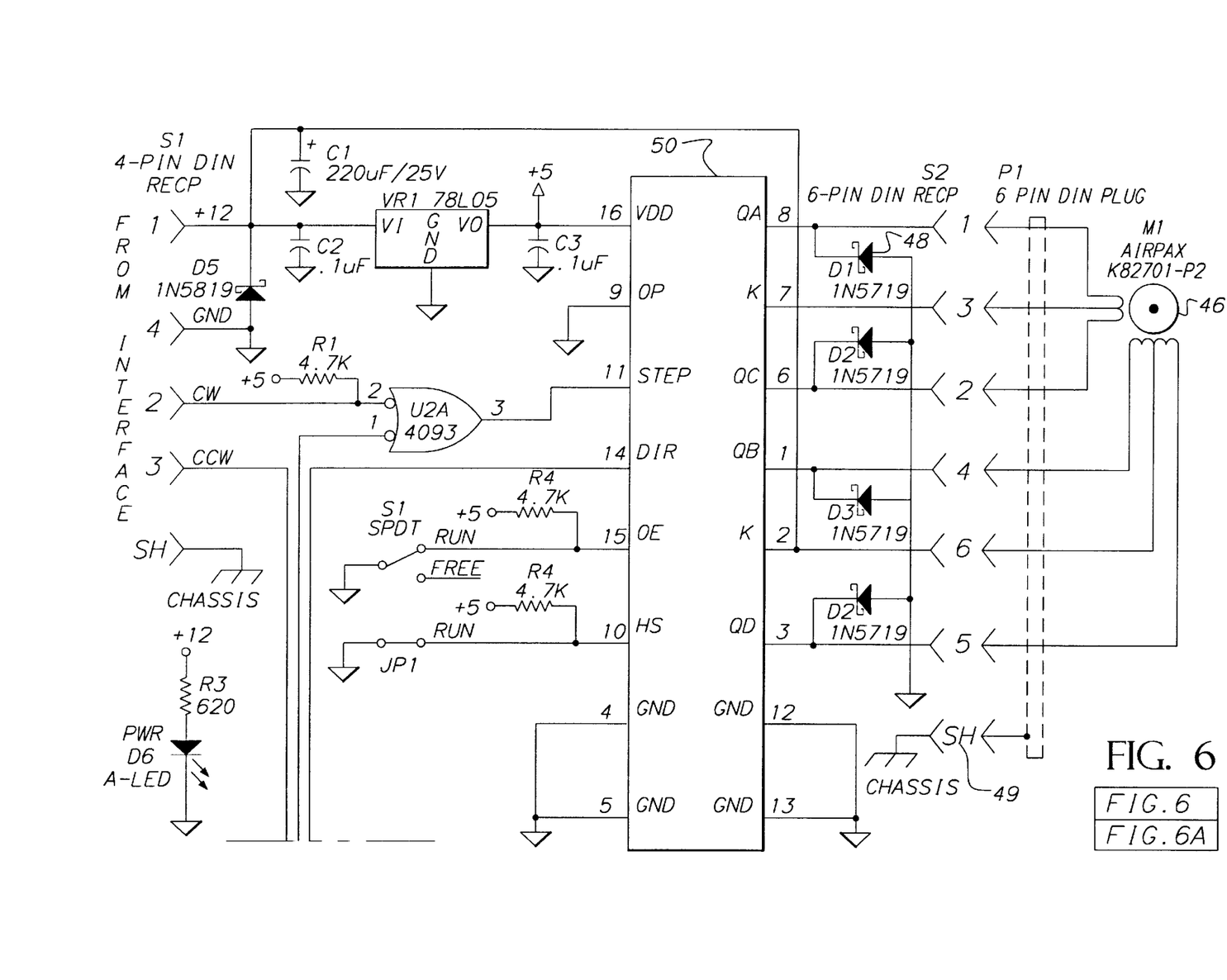
FIGS. 6 and 6A are schematic representations of a preferred motor driving circuit for use in the present invention.
Figure 6A:
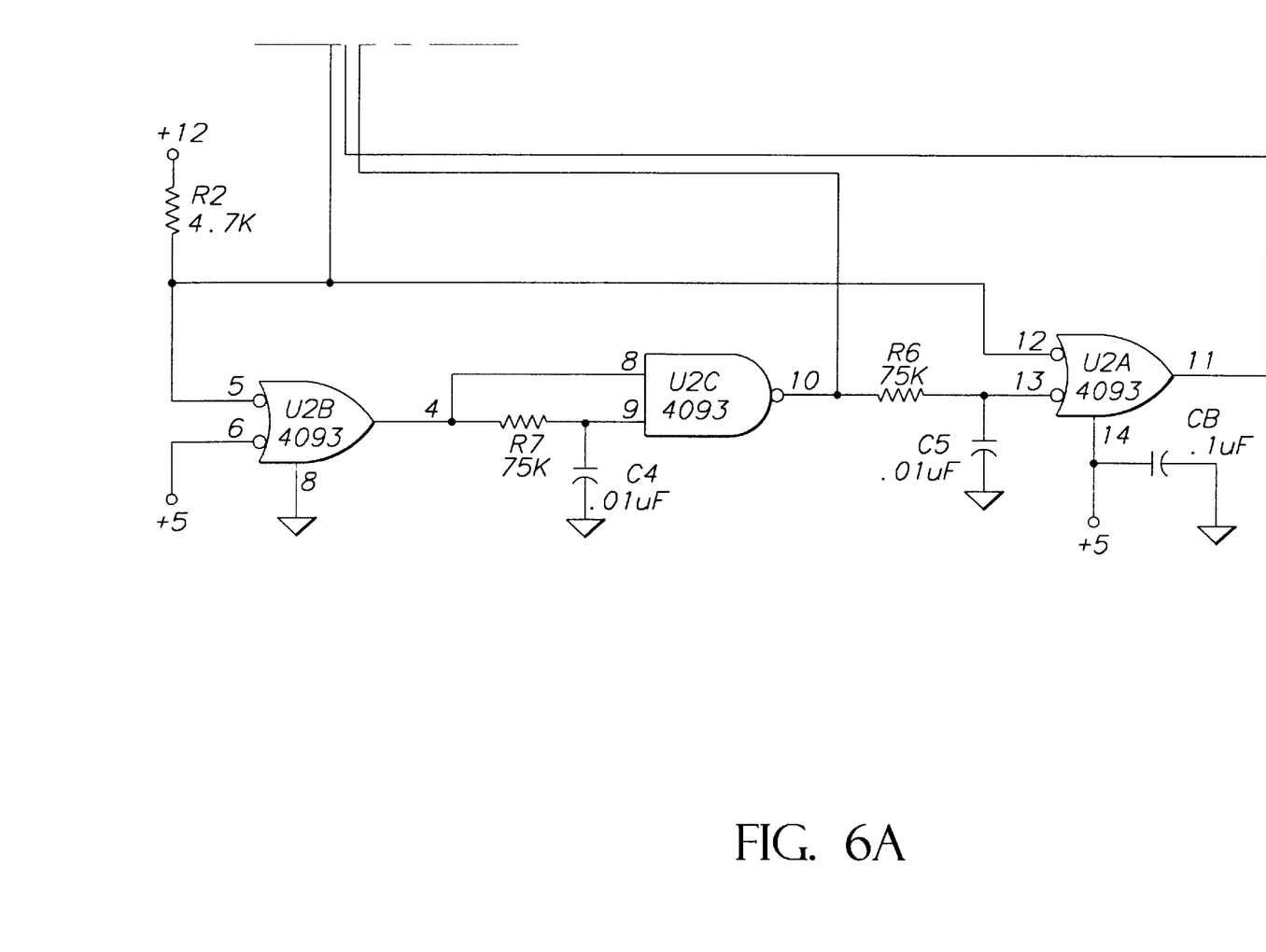

Referring to FIGS. 6 and 6A, the stepper motor 46 will preferably be controlled by a circuit which provides the proper waveform to generate a step. The present invention may include software for making the rotating polarizer compatible with previously existing PD camera programs. In operation, the crystal control signal is synchronized with the frame acquisition procedure. Once the CCD camera sets the routine into action, the program may create a series of images which simulates a live PD image. Once the polarizer is set in place, acceptable amounts of background polarization may be minimized to within acceptable percentage of the total amplitude. For example, if the acceptable percentage is two and if the average raw intensity across the screen in an NP image is 100 (on a scale of zero to 255), the average background polarization difference signal in the absence of a target would have an absolute value of less than two.

As shown in FIG. 5, the automatic rotational polarizer automatically locates the best sets of vectors. An algorithm measures average intensity information, compares it to the information from the previous frame, and move the polarizer accordingly.

In operation, the crystal 38 must stay in each of its two states for approximately 4.5 seconds. The transition time from state to state is not a major concern for current applications. The crystal 38 must also operate effectively at room temperature (~25° C.) and the attenuation of the crystal should be negligible.

Figure 7:
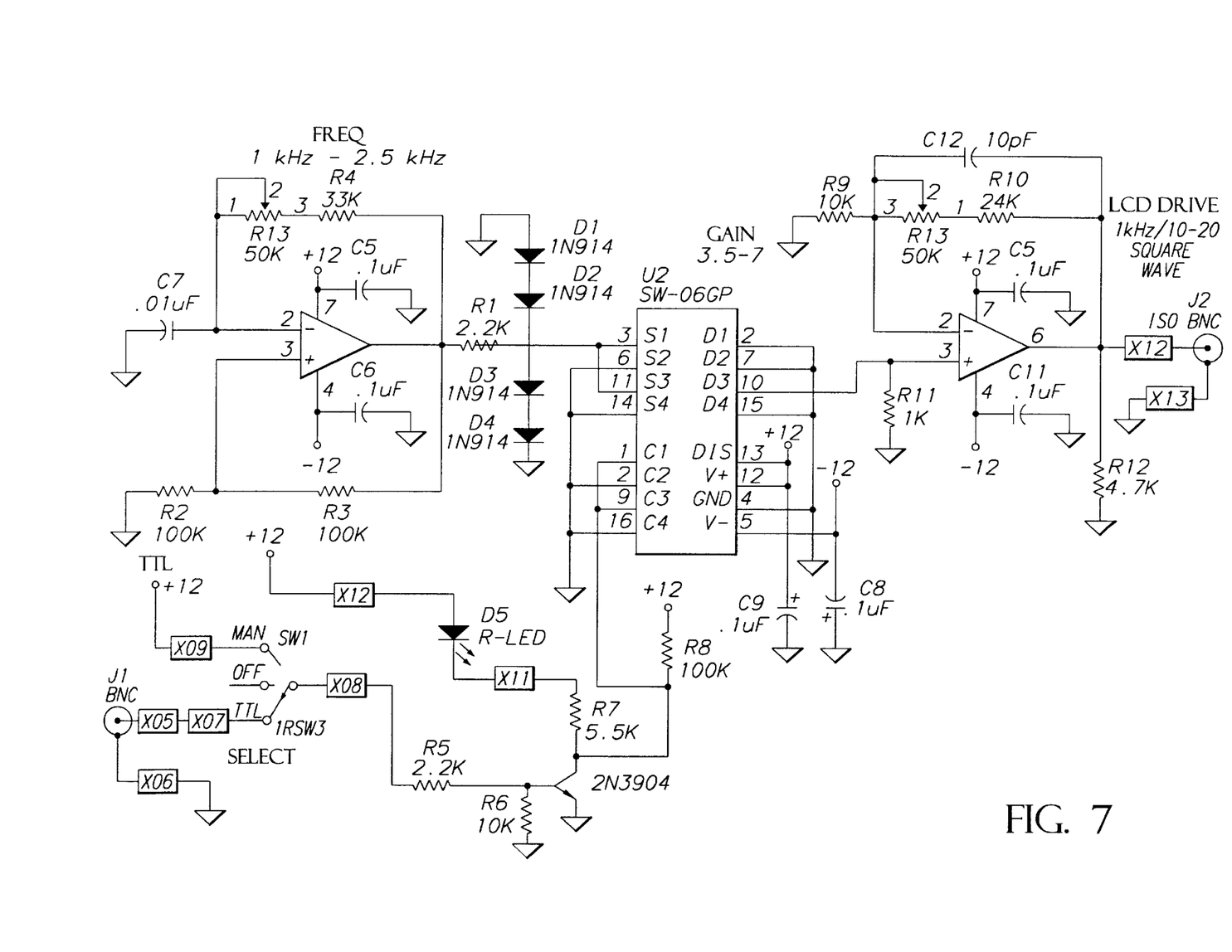
FIG. 7 is a schematic representation of a liquid crystal driver circuit for use in the present invention.
Figure 8:
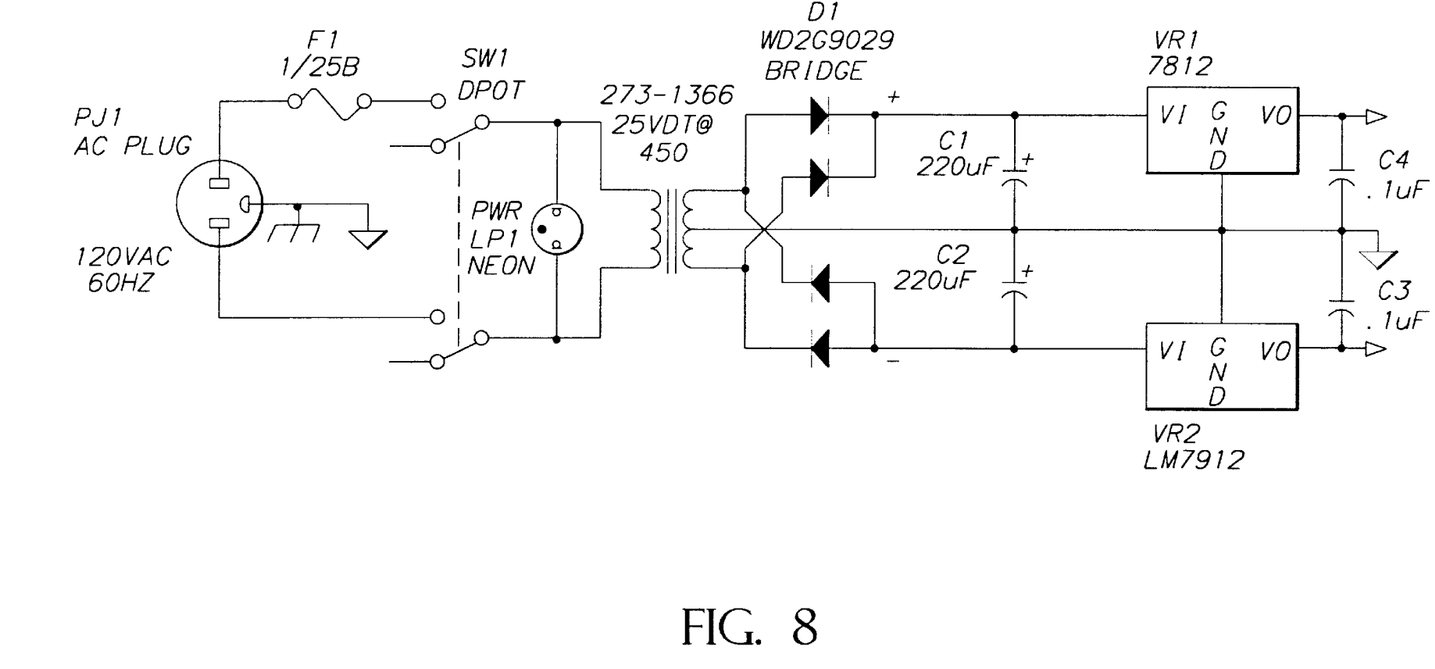
FIG. 8 is a schematic representation of a power circuit for the liquid crystal circuit for use in the present invention.

Referring to FIG. 7, the driver circuit for the crystal 30 produces an AC wave form which operates in the 1 kHz frequency range with a negligible DC offset. This prevents a DC current from flowing through the LC crystal which could damage the liquid crystal cell. The amplitude of the wave form must be at least 5 volts, but is preferably 10 volts for optimum performance. The power supply must be able to deliver 20 mA of current to the various parts of the circuit. Using an Op amp, three resistors, and a capacitor, symmetric square waves can be generated in the frequency range of 1 kHz. The output from this oscillator is limited to 1.4 V by stacking diodes 48, then is fed into the input of a digital switch 49. The gate of the switch is controlled by a TTL input which causes the switch to be closed when the TTL signal is high and open when the TTL signal is low. The output of the switch is fed into a non-inverting, variable gain amplifier.

Stepper motor 46 must provide sufficient torque to easily turn the rotatable linear polarization analyzer 39. The step size of the motor should be preferably less than 2 degrees and the motor should be able to rotate in both directions. The motor must be coupled to the linear polarizer by a means of a belt or gearing system that allows for smooth rotation of the polarizer.

Referring to FIGS. 6 and 6A the motor driving circuit 48 must be able to take a digital signal from the I/O card on the computer and convert it to the appropriate signal to drive the motor. The circuit will take two inputs, a directional input and a step/stop input and use that information to drive the motor.

A preferred stepper motor 46 for use in the present invention is a four phase, 200 step stepping motor manufactured by Superior Electric and is controlled by a motor driver circuit interfaced to the computer. The motor 46 is coupled to the analyzer 39 with timing gears and a timing belt. The motor driver circuit takes an input signal and uses logic gates in conjunction with RC timers to create the necessary waveform to drive the motor. As shown, in one embodiment motor driver may comprise a UCN5804 stepper motor driver chip 50.

The present invention has been described with reference to the enclosed figures. It is to be appreciated that other embodiments fulfill the spirit and scope of the invention so that the true nature and scope of the invention is to be determined with reference to the attached claims.

We claim:

1. A method for utilizing polarization differences to provide enhanced visual perception of a scene comprising the following steps:

capturing a first optical signal of said object at a first polarization direction;

capturing a second optical signal of said object at a second polarization direction;

subtracting said second signal from said first signal so as to produce a difference signal, amplifying the difference signal such that the amplified difference values represent an enhanced image of the object.

2. The method of point 1 further comprising the step of rotationally adjusting said first and second directions to a position which optimizes the contrast of the said amplified difference values.

3. The method of claim 1 wherein said first and second optical signals are captured at different orthogonal polarization directions.

4. Apparatus for increasing the distance at which an object may be visible using polarization difference signals comprising:

means for obtaining an optical signal of the object having a polarization at a first polarization direction and for obtaining an optical signal of the object having a polarization intensity at a second orthogonal direction;

means for subtracting the second optical signal from the first signal so as to produce a difference signal;

amplification means for amplifying said difference values such that image of said object is maximized full dynamic; and, display means for displaying said object.

5. The apparatus of claim 4 further comprising means for rotating said image-obtaining means.

6. The apparatus of claim 5 wherein said image-obtaining means is controlled by a stepper motor.

7. The apparatus of claim 4 wherein said image-obtaining means comprises a twisted nematic liquid crystal.

8. Apparatus for increasing the distance at which an object may be visible using polarization difference signals comprising:

means for obtaining an optical signal of the object having a polarization at a first polarization direction and for obtaining an optical signal of the object having a polarization intensity at a second orthogonal direction;

means for subtracting the second optical signal from the first signal on a pixel by pixel on a screen basis so as to produce a difference signal;

amplification means for amplifying said difference signal such that image of said object uses the full dynamic range of said screen; and, display means for displaying the image of said object.

* * * * *